Jan. 10, 1928.
F. C. BLANCHARD
1,655,779
LUBRICATOR
Filed July 17, 1924
Fig.1.
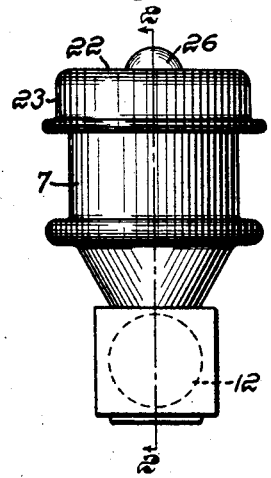
Fig.2.
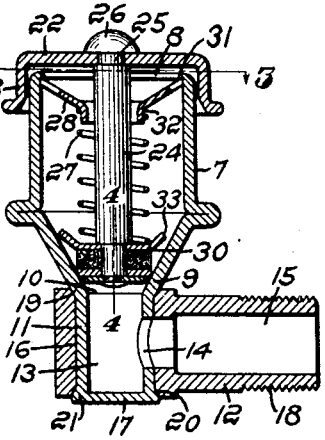
Fig.3.
Fig.4.
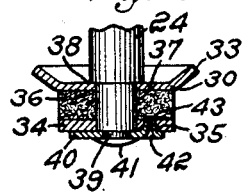
Fig.5.
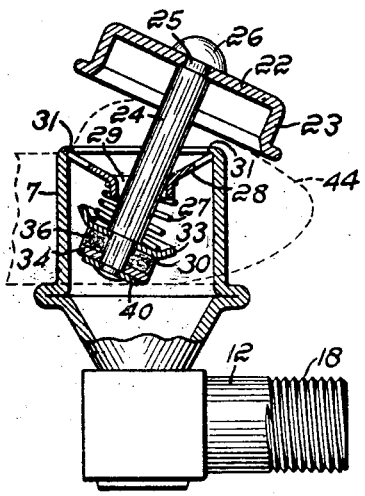
Fig.6.
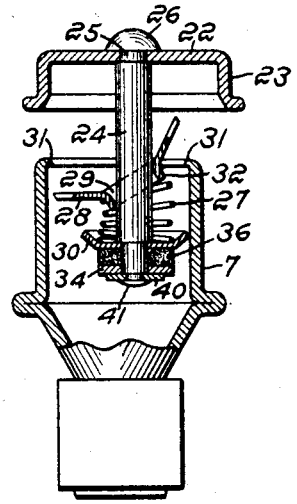
Inventor:
Frederick C. Blanchard,
by Emery, Booth, Janney & Varney
Attys.

Patented Jan. 10, 1928.

1,655,779

UNITED STATES PATENT OFFICE.

FREDERICK C. BLANCHARD, OF DORCHESTER, MASSACHUSETTS.

LUBRICATOR.

Application filed July 17, 1924. Serial No. 726,518.

This invention relates to a novel and improved lubricator for lubricating automobile parts and other machinery.

The invention will be best understood by reference to the following description, when taken in connection with the accompanying drawings of one specific embodiment thereof, while its scope will be more particularly pointed out in the appended claims.

In the drawings:

Fig. 1 is an elevation, on an enlarged scale, of the lubricator exemplifying the invention, showing the cover in its normal closed position;

Fig. 2 is a sectional view on line 2—2 of Fig. 1;

Fig. 3 is a sectional view on line 3—3 of Fig. 2;

Fig. 4 is a sectional view on an enlarged scale on line 4—4 of Fig. 2;

Fig. 5 is a sectional view similar to Fig. 2, illustrating the lubricator as it appears opened for the introduction of oil; and Fig. 6 is a vertical, sectional view of the lubricator illustrating the mode of assembling the parts.

Referring to the drawings, and to the embodiment of the invention which is selected for exemplification, there is shown a lubricator comprising a body 7, presenting a reservoir having an inlet 8 for the introduction of oil, and a valve seat 9 presenting an outlet 10 to be connected to the bearing which is to be lubricated. In the present example, the body is conveniently drawn from sheet metal, which may be connected in any convenient manner to an opening leading to the bearing to be lubricated. In the case of a bearing having a laterally disposed opening calling for the use of an elbow, the reservoir has an outlet elbow, herein conveniently formed of two conduits 11 and 12, the conduit 11 having a longitudinal passage 13 and a transverse passage 14, and the conduit 12 having a longitudinal passage 15 and a transverse passage 16. The conduit 11 has its lower end closed by a wall 17, and is formed as an integral part of the reservoir. This conduit is inserted in the transverse passage 16 of the other conduit, with its transverse passage 14 in registration with the longitudinal passage 15 in the conduit 12.

The conduit 12 is conveniently formed as a screw machine part having a threaded nipple 18, which may be screwed into a tapped opening leading to the bearing. In the process of manufacture, the upper portion of the passage 15 can be drilled, while the part is in the screw machine, and the remainder drilled after the two conduits have been assembled. To ensure a strong and oil-tight connection between the two conduits, the upper end of the passage 16 is countersunk as at 19, and the lower end is similarly countersunk as at 20 to present tapered seats, the upper one for a correspondingly tapered lateral wall presented by the reservoir, and the other for a correspondingly tapered flange or lip 21 formed by squeezing the lower closed end of the conduit 11. By this means, the inner and outer tapered parts are firmly seated against each other, and leakage of oil is prevented, while at the same time an easily assembled and strong outlet elbow for the cup is presented.

The inlet of the cup is normally closed by a cover 22, presenting a depending flange 23 about the sides of the reservoir to exclude dust and water therefrom. This cover is conveniently attached to a stem 24, as by providing the latter with a reduced portion 25 extending through the cover and riveted as at 26. The cover is held normally closed by a spring 27, one end of which is seated against an abutment, herein a yoke 28, presenting an opening 29, through which the stem extends, while the other end of the spring is seated against an abutment 30 carried by the stem. The opening 29 is considerably larger than the stem 24, and permits the stem and cover to tilt obliquely to some such position as that illustrated in Fig. 5, for the convenient introduction of oil into the reservoir.

The yoke 28 spans the inlet 8, but in no wise interferes with the introduction of the oil into the reservoir, as will be evident from an examination of Fig. 3. Herein the yoke is held in place solely by the spring, which urges the same in an upward direction against an abutment presented by an inwardly projecting elbow or flange 31, about the inlet. The upper end of the spring is disposed about and centered with relation to the yoke by providing the latter with a depending flange 32, which the upper end of the spring encircles, while the lower end of the spring is centered by an upwardly extending flange 33, presented by the abutment 30. In practice, the yoke is conveniently assembled with the reservoir by introducing the yoke through the inlet of the reservoir in an oblique position such as that represented in Fig. 6, and after both ends of the yoke have passed beyond the inwardly projecting flange, the yoke is released and allowed to rise against the flange under the influence of the spring, where it will remain without danger of accidental dislodgment. In case of necessity, the removal of the yoke can be effected by a reversal of the foregoing operation.

To ensure an ample supply of lubricant between the bearing surfaces, and to carry away the foreign substances and worn metal, as well as old, vitiated lubricant, provision is made for initial feeding of the bearing, followed by a relatively slow feed of lubricant thereinto. To this end, the outlet is normally closed by a valve 34 of appropriate, compressible substance such as a commercially known gasket material called vellumoid, which yields sufficiently under pressure of the closing spring to prevent leakage of oil between the valve and its seat, while the material itself is impervious. However, the valve is provided with a perforation 35, above which is a permeable body, herein a felt washer 36, which permits a very slow, restricted escape of oil from the reservoir. The proportions and density of the felt disk are selected to suit the particular conditions under which the lubricator is used. Herein, the valve and felt disk are secured to the stem 24 by providing the latter with a reduced portion 37, presenting a shoulder 38 for the abutment 30, against which the felt disk is seated, and said stem is provided with a second reduced portion, presenting a shoulder 39 against which a metal washer 40 is secured by riveting the lower end of the stem as at 41. By this means, the space within which the felt washer is confined is very conveniently determined, and inasmuch as its permeability is dependent upon the degree of compression with which it is held, accuracy of feed is thus assured. In manufacture, the distance between the shoulders 38 and 39, as compared with the combined thickness of the washers, can be made to suit the particular circumstances under which the lubricator is to be used.

In the present example, the washer 40, which holds the valve in place on its stem, happens to be so large in diameter as to overlap the perforation 35 in the valve, and the washer is therefore provided with a perforation 42, which registers with the perforation 35. Registration between these two perforations is assured by providing an appropriate interengagement between the washer 40 and the valve 34, as by providing the washer with a perforation 43. In the present example, this projection is conveniently formed by punching a hole in the washer, the metal being extruded to form the projection, which thus presents the desired opening for the passage of oil from the reservoir to the outlet.

To operate the lubricator, the cover is first lifted from the position shown in Figs. 1 and 2 to some such position as that represented in Fig. 5, as by the use of a forked implement 44 indicated by dotted lines. This operation of lifting the cover also opens the valve. It follows that at first, the lubricant will run freely through the outlet to the bearing, thus flooding the latter. When the bearing has taken up all the oil it can hold, as the supply of oil into the reservoir continues, the level will rise within the reservoir. The supply of lubricant should be discontinued when the reservoir is nearly or quite filled, after which the cover should be released, and the cover and valve allowed to close under the influence of the spring. The working part which is thus lubricated can be started with the assurance of an ample supply of oil. Subsequently, during the operation, a slow feeding of oil takes place by way of the normal feeding device,—that is to say, by seepage through the felt washer. Referring again to Fig. 5, when, after the valve and cover having been lifted, they are released and allowed to close, the laterally and upwardly projecting flange 33 carried by the valve stem constitutes a guard which is adapted to cooperate with the sides of the reservoir to facilitate the seating of the valve under the influence of the spring, thus preventing any possibility of the valve lodging against the upper portion of the inclined lateral wall of the reservoir.

Having thus described one embodiment of the invention, but without limiting myself thereto, what I claim and desire by Letters Patent to secure is:

1. In an oil cup, the combination of a body presenting a reservoir having an inlet, a yoke spanning said inlet, said yoke and said body having a relative form and arrangement providing for assembling one with and dismounting it from the other by passing said yoke through said inlet, a cover for said inlet, a stem carried by said cover, extending through said yoke and presenting an abutment, and a cover closing spring encircling said stem, and resting at one end against said yoke and at its other end against said abutment.

2. In an oil cup, the combination of a body presenting a reservoir having an inlet, an abutment adjacent said inlet, a yoke spanning said inlet and resting against said abutment, said yoke and said body having a relative form and arrangement providing for assembling one with and dismounting it from the other by passing said yoke through said inlet, a cover for said inlet, a stem carried by said cover, extending through said yoke and presenting an abutment, and a cover closing spring encircling said stem and resting at one end against said yoke and at its other end against the second-mentioned abutment.

3. In an oil cup, the combination of a body presenting a reservoir having an inlet, a yoke spanning said inlet and presenting an opening, said yoke and said body having a relative form and arrangement providing for assembling one with and dismounting it from the other by passing said yoke through said inlet, a cover for said inlet, a stem carried by said cover, extending through said opening and normally separated from the margin thereof by a space permitting said cover and stem to be displaced to an oblique position with relation to said body, said stem presenting an abutment, and a cover closing spring encircling said stem and resting at one end against said yoke and at its other end against said abutment.

4. In an oil cup, the combination of a body presenting a reservoir having an inlet, a lateral abutment, a yoke spanning said inlet, resting against said abutment and presenting an opening, a cover for said inlet, a stem carried by said cover, extending through said opening and normally separated from the margin thereof by a space permitting said cover and stem to be displaced to an oblique position with relation to said body, said stem presenting an abutment, and a cover closing spring encircling said stem and resting at one end against said yoke and at its other end against said abutment, said yoke being held in place by said spring and being insertable into and removable from its place after compressing said spring and moving said yoke into an oblique position in which it can be passed through said inlet.

5. In an oil cup, the combination of a body presenting a reservoir having a circular inlet, an annular lateral abutment surrounding said circular inlet, a yoke spanning said inlet, resting against said abutment and presenting an opening, said yoke having a length greater than the diameter of said inlet and a width less than said inlet, a cover for said inlet, a stem carried by said cover, extending through said opening and normally separated from the margin thereof by a space permitting said cover and stem to be displaced to an oblique position with relation to said body, said stem presenting an abutment, and a cover closing spring encircling said stem, resting at one end against the second-mentioned abutment and at its other end against said yoke, thereby urging said yoke against the first-mentioned abutment, said yoke being insertable into place within said body and against the first-mentioned abutment and being removable therefrom after movement into an oblique position in which its ends are clear of such abutment.

6. In an oil cup, the combination of a body presenting a reservoir having an inlet and an outlet, a cover for said inlet, a stem rigidly related to said cover, an abutment through which said stem extends, another abutment carried by said stem, a valve for said outlet carried by said stem below said other abutment, and a cover-closing spring interposed between said abutments.

7. In an oil cup, the combination of a body presenting a reservoir having an inlet and an outlet, a cover for said inlet, a stem carried by said cover, an abutment presenting an opening through which said stem extends and within which said stem is permitted to move laterally and to tilt obliquely, another abutment carried by said stem, a valve for said outlet carried by said stem below said other abutment, and a cover-closing spring interposed between said abutments.

8. In an oil cup, the combination of a reservoir, a valve seat presenting an outlet from said reservoir, a valve normally closing said outlet and presenting an opening affording a means of communication between said reservoir and said outlet, a valve stem, a permeable body carried by said stem within said reservoir and covering said opening, and a valve retainer secured to said stem and holding said valve and said body in place on said stem.

9. In an oil cup, the combination of a reservoir, a valve seat presenting an outlet from said reservoir, a valve normally closing said outlet and presenting an opening affording a means of communication between said reservoir and said outlet, a valve stem, a permeable body carried by said stem within said reservoir and covering said opening, and a valve retainer secured to said stem and holding said valve and said body in place on said stem, said retainer presenting an opening communicating on the one hand with said reservoir and on the other hand with said outlet.

10. In an oil cup, the combination of a reservoir, a valve seat presenting an outlet from said reservoir, a valve normally closing said outlet and presenting an opening affording a means of communication between said reservoir and said outlet, a valve stem, a permeable body carried by said stem within said reservoir covering said opening, and a valve retainer secured to said stem and holding said valve and said body in place on said stem and means to maintain said communication.

11. In an oil pump, the combination of a reservoir, a valve seat presenting an outlet from said reservoir, a valve of compressible material normally closing said outlet and presenting an opening affording a means of communication between said reservoir and said outlet, and permeable means restricting escape of oil from said reservoir through said opening to said outlet.

12. In an oil cup, the combination of a reservoir, a valve seat presenting an outlet from said reservoir, a valve of compressible material normally closing said outlet and presenting an opening affording a means of communication between said reservoir and said outlet, compressible, permeable means restricting escape of oil from said reservoir through said opening to said outlet, and means predetermining and maintaining the degree of permeability of said permeable means.

13. In an oil cup, the combination of a reservoir, a valve seat presenting an outlet from said reservoir, a valve of compressible material normally closing said outlet and presenting an opening affording a means of communication between said reservoir and said outlet, compressible, permeable means restricting escape of oil from said reservoir through said opening to said outlet, and means maintaining said permeable means under a predetermined degree of compression.

14. In an oil cup, the combination of a body presenting a reservoir, and an outlet elbow therebelow comprising a vertical conduit presenting a vertical passage closed at its lower end and a horizontal passage leading from one side thereof, a horizontal conduit presenting a vertical passage having two open ends, and a horizontal passage communicating with said vertical passage between said ends, said vertical conduit extending into the upper end of said vertical passage and having its closed end closing the lower end of said vertical passage.

15. In an oil cup, the combination of a reservoir, a valve seat presenting an outlet from said reservoir, a laterally and axially displaceable valve normally seated on said seat, a spring adapted to reseat said valve after it has been unseated, and means carried by said valve and adapted to cooperate with the lateral wall of said reservoir to guide said valve to a position coaxial with said seat, and seating said valve under the influence of said spring.

16. In an oil cup, the combination of a reservoir having converging lateral walls presenting a valve seat, a valve normally seated on said seat, a spring adapted to reseat said valve after it has been unseated, and a guard carried by and projecting laterally from said valve and adapted to cooperate with the sides of said reservoir to facilitate seating of said valve under the influence of said spring.

In testimony whereof, I have signed my name to this specification.

FREDERICK C. BLANCHARD.